Sept. 5, 1967 W. P. HARBOUR, JR., ET AL 3,340,516

MASTER-SLAVE NET CONTROL

Filed April 27, 1965

INVENTORS.
WILMER PAUL HARBOUR, JR.
ROBERT A. KOLPEK
THOMAS L. MUSTO

BY John A. Brady
ATTORNEY.

3,340,516
MASTER-SLAVE NET CONTROL
Wilmer Paul Harbour, Jr., Robert A. Kolpek, and Thomas L. Musto, Lexington, Ky., assignors to International Business Machines Corporation, Armonk, N.Y. a corporation of New York
Filed Apr. 27, 1965, Ser. No. 451,189
63 Claims. (Cl. 340—172.5)

Figure 1A:
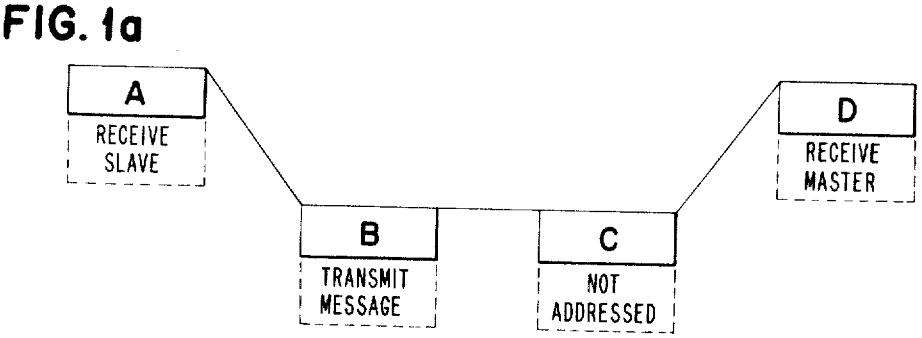

This invention is related to the long distance communication between recording terminals, such as typewriters. More particularly, this invention relates to the coordination between several terminals so that replies communicated between terminals can be effectively accomplished.

Complete flexibility in selection of terminals in a high quality communication net is not presently known. By "complete flexibility" is meant the ability for one transmitter to select (often termed "address") any one or any combination of terminals in the net for receipt of a message. By "high quality" is meant, as a practical matter, the ability of a receiving station to periodically and accurately reply that errors have been observed in the received text.

Addressing, of course, is well known in the art. It is possible in accordance with many and various teachings in the prior art to structure terminals to recognize permutation codes in preselected sequences. The transmitter merely sends the required code sequences to cause one or any combination of terminals in the net to come to a status (sometimes called "mode") in which the addressed stations record transmitted messages.

Communication of error is also known, as particularly illustrated in the 1050 communication system presently marketed by the assignee of this invention. Each receiving station may have the ability to observe received character codes for a parity error (called vertical redundancy check), and to remember that such an error has occurred. Additionally, each receiving station may have the ability to compute the parity of all characters received between parts of the transmitted message (called longitudinal redundancy check). The transmitting terminal periodically sends an error interrogation signal (sometimes called End of Block or EOB). The receiver is automatically structured to reply with a code representing no-error or a code repesenting yes-error depending upon which is the case. Upon a yes-error signal, both the receiver and the transmitter print a visual symbol, such as a hyphen. The machines are structured to treat the message materials between EOB signals as independent groups for the observation of the message for error. Indication that an error has occurred is used as a warning of inaccuracy to those reading the text and also as a signal to the operator that portions of the text perhaps should be retransmitted.

Formerly, the conversation between transmitter and receiver in the manner described has prevented complete flexibility in terminal selection in the communicating net. The art has devised the concept of structuring one permanently preselected station as the replying station. However, use of this concept immediately forecloses complete flexibility in selection of terminals since the station structured to reply must be included in the net. The prior art has apparently been content with thtis, but, in accordance with this invention, it is demonstrated that a much higher quality can be incorporated into the net through a flexibility in choice of the reply station. In accordance with this invention, it is recognized that certain stations may be in a communications link more subject to error than others. That station should make the error replies, not a terminal not subject to error or a terminal which, although subject to error, is not a station to which transmission is actually desired.

It is an object, therefore, of this invention to provide a communications net of increased flexibility and increased quality of information exchanged.

It is a more specific object of this invention to provide a communications net in which the reply of an error signal is more accurate with regard to the entire net.

It is another more specific object of this invention to provide a communications net in which the reply of an error signal does not include errors at terminals to which communication is not desired.

In accordance with this invention, code responsive means are provided at a plurality of terminals which allow each terminal to become an error reply station or not, depending upon the codes received at that terminal. All or selected ones of the terminals may be addressed. One terminal is also selected by the transmission of a selection code which designates that terminal. That terminal then subsequently replies to error interrogations. The other addressed terminals record messages, but they do not reply to error interrogation signals.

Selection of the reply terminal is completely in control of the transmitter. Generally the transmitter will select the most distant station or the station linked by a more unreliable link, such as by a radio link. In accordance with more specific aspects of the preferred embodiment of this invention, selection of the reply terminal is accomplished by simply addressing that terminal last. This sequence of addressing is a unique permutation of signals in itself, and selection in this way presents a minimum of complications to the transmitting operator.

The foregoing and other objects, features and advantages of the invention will be apparent from the following more particular description of preferred embodiments of the invention, as illustrated in the accompanying drawings.

Figure 1B:
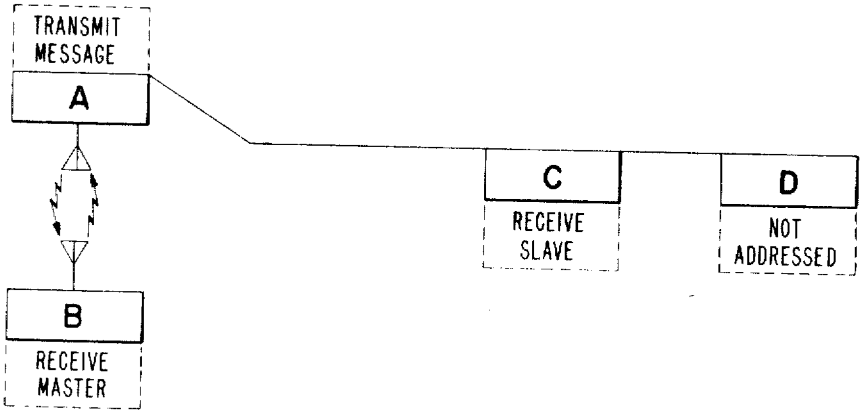

FIGS. 1*a* and 1*b* are illustrations of the net control system in accordance with this invention.

Figure 2:
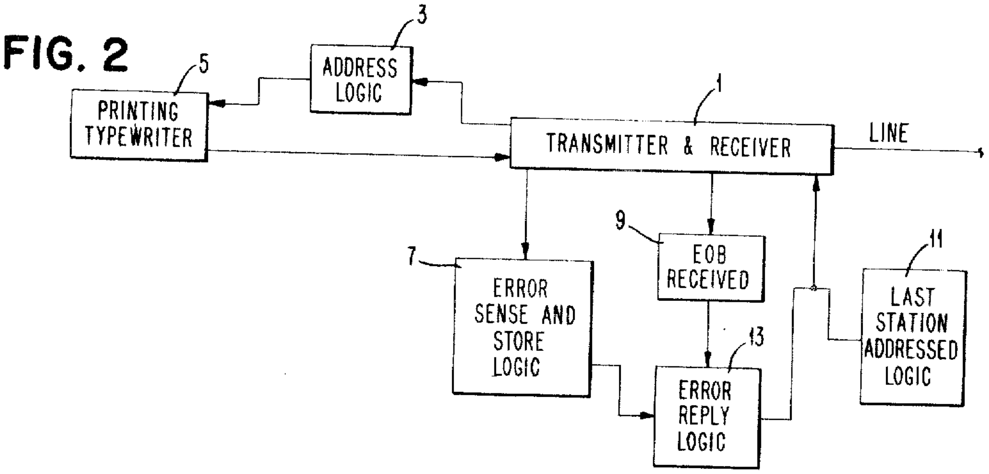

FIG. 2 illustrates the logic at each terminal in accordance with this invention.

*Environment and structures*

Although the communications system herein described is new, it was built to be compatible with the 1050 data data communication system presently marketed by the assignee of this invention. Reference is made to "System Operation Reference Manual, IBM 1050 Data Communication System," File No. 1050–9, Form A24–3020–3, Major Revision, January 1965, a copyrighted publication which describes the 1050 system. Where structures associated with the invention described herein are not specifically noted, it is intended to imply that one skilled in the art could refer to the structures taught and adequately suggested by the 1050 system.

The machine herein described is entirely electronic and logic responsive, except for the recording unit. The recording unit is preferably an input/output version of the IBM "Selectric" (single element type head) typewriter. Other recording units are, of course, equally preferred, depending upon the application.

In accordance with the logical circuits making up each terminal, the machine adopts logical modes. Physically these modes are switched, not-switched electrical conditions of five trigger circuits. The outputs of these triggers are inputs to AND circuits, OR circuits, connections to memory register electrical assemblies, and similar electrical elements well known to the state of the art. As mentioned, the entire terminal operation, with the exception of the typewriter, is basically an electrical application of Boolean and similar logic. Even when a reply signal, such as a no-error reply, is internally generated, it is generated with an electrical circuit using Boolean logic.

Often a code sent by a transmitter is used to change the logical status of the transmitter. In implementing this in an electrical system it is preferred to observe by connections to an electrical storage register codes which are held for transmission in a shift register. Since the shift register and most of its associated structures are utilized to both transmit and receive, transmitted codes are observed by the machine logic with structures also used to observe received codes. The codes acted upon are permutation signals of the binary (one bit, zero bit) type in which several bits combine to make a single permutation code. The bits are received and transmitted by the shift register and are observed by the machine logic connected to a storage register which is in communication with the shift register.

Received or transmitted information is recorded when it is printed for visual reading or impressed on permanent records such as paper tape. The term "record" should therefore be understood to include the acting upon functions, such as spacing, during a printing for visual display.

*Addressing sequence*

An illustrative sequence of system operation is as follows: Reference is made to FIG. 1*a*.

Any of the stations A, B, C, or D may become the transmitter by depression of a bid key on the keyboard of the typewriter of each station. An interlock is provided to monitor the line and make the bid unsuccessful if any signal is on the line, since this condition establishes that the line is in use. If no signal is on the line, the bid is successful and the station at which the bid key was depressed comes up as a transmitter. A signal is continuously sent from a transmitter thereby preventing subsequently bidding stations from becoming transmitters. It will be assumed that station B is the successful, bidding station.

A successfully bidding station is in a logical mode to transmit for the purpose of designating selected stations in the communications net for communication of messages. This may be called the Transmit Station Select mode.

(1) The transmitter then depresses his comma key (or otherwise sends a comma code). The other stations are standing by with power on, which is a mode in which a comma code is recognized logically as a Start of Address signal. The Start of Address signal is recognized at each receiver to bring each receiver to a logical mode in which an address is expected. The mode of the receiver may be called the Control Address mode. At times the transmitter will communicate with other stations in order to ask them individually as selected to transmit messages. This is called polling, and the transmitting station originates the distinction between addressing and polling by initiating its signal with a Start of Address signal when addressing is the desired function.

(2) Station B next sends the specific designator of a particular station being addressed. This may be a single alphabet code which is the same as the station name. Station A will be first addressed in this example. The transmitter therefore sends the code for A at this time in the addressing sequence. The specific designator of A is ineffective at all stations but station A. At station A the logic mode changes to a specifically selected logical status, which may be termed the Control Address Selected mode.

(3) Station B then sends a space code. This is responded to at a station in the Control Address Selected mode (station A) by a change to a status reply mode, which may be called the Transmit Status Answer Back mode. The transmitter (station B) electrically monitors the register associated with its own transmitter and receiver. Upon the observation of the space code, the station B switches to a temporary receive logical mode looking for a status reply; this may be called the Receive Address Answer Back mode.

(4) Station A is in a Transmit Status Answer Back mode. In this mode either a yes-status code or a no-status code will be transmitted. Each terminal has sensors at its terminal indicating that it has status, that is, paper in the print station and similar fundamental requirements. Station A monitors its own register associated with its transmitter and receiver to thereby change mode in accordance with the signal it transmits.

(5) If a yes-status is answered, the station A immediately switches to a fully addressed and potentially ready to receive logical mode, which may be called the Control Selected mode.

(6) If a no-status is answered, an alarm rings at station A to indicate that status is improper, and station A reverts to a Control Address mode, a mode in which it may be addressed once again and status may be inquired as to once again.

(7) A reply of either a yes-status or a no-status reverts station B to a Transmit Station Select mode. The printout at station B indicates if status is proper. The yes-status code is the period code, and therefore a period is printed to indicate proper status. A no-status code is the hyphen code, and therefore a hyphen is printed to indicate improper status.

(8) Station A has not printed text up to this time. It is now in the Control Selected mode, however, and may be brought to a logical status at which printing will occur, which may be called the Receive Text mode, by the reception of an End of Address (sometimes called EOA) code. The EOA code is the pound sign on the transmitting typewriter.

In accordance with this invention in the addressing of multiple stations, however, the EOA code may not be sent immediately.

*Master-slave selection*

Continuing the above example, station A is in the Control Selected mode. The Start of Address signal originally transmitted by station B has brought other stations to the Control Address mode, where they remain during the normal sequence of signals as above described.

In this example it is assumed that station B does not wish to communicate with station C. Therefore, the code for C is not sent. Also, as in FIG. 1*a*, station B does desire to communicate with station D, and station D has been selected as the error reply station because, as the station furthest away, it is assumed that the replies of station D will best indicate the error status of messages received.

Continuing the above example, therefore:

(9) Station B next sends the specific designator code for D by depressing the D code on his keyboard. As above described for station A, station D goes to the Control Address Selected mode.

(10) Station B then sends the space code. As above described for station A, station D goes to the Transmit Status Answer Back mode; station B goes to the Receive Address Answer Back mode.

(11) The machine conversation establishing status is then conducted as above described. Ultimately, station D goes to the Control Selected mode.

(12) The Control Selected mode at station A, however, has been modified to a new mode, which might be called the Control Selected Slave mode. The terminals are structured to go from a Control Selected mode to a Control Selected Slave mode upon the receipt of a yes-status signal. Although any received signal might be used for this purpose, use of the yes-status signal indicates definitely that a second station will be in the communications link and that that second station was addressed subsequently. If status can not be established at station D, it is possible by sending a single code signal to communicate messages with station A as the master.

(13) Addressing designation of different stations being accomplished, station B now sends the EOA code. Station A having been specifically designated during addressing before the last station replying yes-status is in the Control Selected Slave mode. The EOA signal therefore brings A to a logical mode in which text will be printed and errors recognized locally, but no reply will be made to an error interrogation; this can be called the Receive Text Slave mode. Station D, having been last specifically designated during addressing is in the Control Selected mode. The EOA signal therefore brings station D to a logical mode in which text will be printed and errors recognized locally and the errors recognized locally will be transmitted as the substance of a reply to an error interrogation; this can be called the Receive Text Master mode. Undesignated stations, station C in the illustration, go to a Text Non-Selected logical mode. Such stations will not respond until an End of Text (EOT) Signal appears on the line. Station B, the transmitting station, must go to a mode in which such codes as space codes do not interrupt transmission. Since station B is in the Transmit Station Select mode, the sending of an EOA at station B is effective to change the mode of station B to a mode suitable for transmission of messages, which can be termed the Transmit Text mode.

It is impossible to anticipate every factor which will influence the choice of which station on a net is to be made the master. Distance will be the usual one, since the greater the distance the more possibility of error at that station. FIG. 1*b* is illustrative of another factor, not having to do with distance. In FIG. 1*b* the station B is on a relatively unreliable radio link, while the more distant stations are on wire. Station A is assumed to be the station which has bid and become the transmitter. As shown in FIG. 1*b*, station B is made the master, since more errors are expected at that station even though station C, the other station addressed, is more distant.

*Text transmission*

After addressing as above, subsequent transmission of text is in the manner of the 1050 machine above mentioned. Designated stations print and execute functions such as tabulation and line space in the manner described.

Periodically, an End of Block (EOB) signal is sent. This is the error interrogation signal. The master station replies, either with a yes-error signal or a no-error signal. The yes-error signal is a code which causes printing of a hyphen. Thus, a hyphen prints at both the transmitter and the master when an error occurred between EOB signals at the master. The slaves cease receiving immediately after a received EOB, but they do not transmit an error reply and they locally print a symbol indicative of errors noted only at that slave station.

The reception or transmission of either a yes-error or no-error signal is recognized logically at all stations participating in the message to bring them back to logical modes in which transmission as before the EOB can be further conducted. The yes-error signal does not cause a print out at any terminal while text is being transmitted after addressing since a print out would interject an extraneous symbol in an otherwise error free message block.

Stations may be constructed to note either vertical redundancy (parity of a character) or vertical redundancy and longitudinal redundancy (identity of parity of all bits transmitted between EOB codes). Character codes having vertical redundancy error are printed out as hyphens immediately at receiving terminals, but the fact of such an error is remembered in the machine. A longitudinal redundancy error check is made in connection with receipt of an EOB signal; (the longitudinal parity at the transmitter is sent for comparison at the receiver automatically, immediately following the EOB code); and a hyphen is printed in the event of longitudinal error at the receiver. As above stated, the transmission of the yes-error signal causes a hyphen to print at the station transmitting the message. A yes-error reply is made when either or both errors have occurred since the last EOB code received.

When all transmissions have been sent from a transmitter, the transmitter sends an End of Text code (EOT). This code is a reserved one which therefore can not properly appear in a message. All stations are structured to respond to this code to go to the standby mode. The standby mode is called Control Receive mode. In the Control Receive mode addressing can be conducted in the manner above described in detail. Thus, the line is then free and no station is addressed. Any station may then bid for and successfully obtain the net in the manner described.

It should also be noted that stations turning power on initially come up in the Text Non-Selected mode. This is intended to prevent such a station from recognizing its address or its polling sequence in messages which may be in transmission. A successful bid for the line puts such a station in the Transmit Station Select mode. An EOT signal received puts such a station in the Control Receive mode.

*Terminal structures*

Although structures of the terminal pertinent to the preferred embodiment of this invention are electrical circuit modules capable of an infinite number of various applications, it should be understood that special mechanical or other structures built to conform to the invention described are within the scope of this patent application.

As shown in FIG. 2, features of the preferred terminal are:

A transmitter-receiver 1, having as a basic feature a single shift register, Address logic 3, adapted to recognize a received address to activate the printing typewriter 5, Error sense and store logic 7 adapted to examine factors such as redundancy in received signals to recognize and remember received errors, EOB logic 9 adapted to recognize an error interrogation signal received, and Last station addressed logic 11 connected with error reply logic 13 to cause transmission of error reply when the station is last addressed.

While the invention has been particularly shown and described with reference to preferred embodiments thereof, it will be understood by those skilled in the art that the foregoing and other changes in form and details may be made therein without departing from the spirit and scope of the invention.

We claim,

1. One terminal for use in a communications system comprising:

means adapted to be responsive when said one terminal receives an address to then receive and record in response to at least some unique signals as received, means adapted to observe errors in at least some received signals and to transmit a signal indicative of said error in said received signals, means adapted to be responsive to the receipt of a first unique signal, including a signal suitable to address at least one other terminal essentially identical in addressing response to said one terminal, to condition said one terminal to receive and record without transmitting said signal indicating error, and means adapted to be responsive to the receipt of a second unique signal, including a signal suitable to address at least one other terminal essentially identical in addressing response to said one terminal, to condition said one terminal to receive and record and to transmit said signal indicative of error.

2. The terminal as in claim 1 in which said first unique signal and said second unique signal each is a sequence of permutation coded signals.

3. The terminal as in claim 1 in which said unique signals which said one terminal is adapted to receive and record are permutation coded signals.

4. The terminal as in claim 2 in which said unique signals which said one terminal is adapted to receive and record are permutation coded signals.

5. The terminal as in claim 3 in which both said signals suitable to address at least one other terminal are suitable to address the same other terminal.

6. The terminal as in claim 4 in which both said signals suitable to address at least one other terminal are suitable to address the same other terminal.

7. One terminal for use in a communications system comprising:

means adapted to be responsive when said one terminal receives a sequence of permutation coded signals to address said one terminal to then receive and record in response to at least some permutation coded signals received, means adapted to observe errors in at least some received signals and to transmit a signal indicative of said error in said received signals, means adapted to be responsive to the receipt of a first unique sequence of permutation coded signals, including a sequence of permutation coded signals suitable to address at least one other terminal essentially identical in addressing response to said one terminal, to condition said one terminal to receive and record without transmitting said signal indicative of error, and means adapted to be responsive to the receipt of a second unique sequence of permutation coded signals, including a sequence of permutation coded signals suitable to address at least one other terminal essentially identical in addressing response to said one terminal, to condition said one terminal to receive and record and to transmit said signal indicative of error.

8. The terminal as in claim 7 in which both said signals suitable to address at least one other terminal are suitable to address the same other terminal.

9. One terminal for use in a communications system comprising:

means adapted to be responsive when said one terminal receives an address to then receive and record in response to at least some unique signals received, means adapted to observe errors in at least some received signals and to transmit a reply signal indicative of said errors in said received signals in response to an error interrogation signal received by said one terminal, means adapted to be responsive to the receipt of a first unique signal, including a signal suitable to address at least one other terminal essentially identical in addressing response to said one terminal, to condition said one terminal to receive and record without transmitting said reply signal, and means adapted to be responsive to the receipt of a second unique signal, including a signal suitable to address at least one other terminal essentially identical in addressing response to said one terminal, to receive and record and to transmit said reply signal.

10. The terminal as in claim 9 in which said first unique signal and said second unique signal each is a sequence of permutation coded signals.

11. The terminal as in claim 10 in which said unique signals which said one terminal is adapted to receive and record are permutation coded signals.

12. The terminal as in claim 11 in which both said signals suitable to address at least one other terminal are suitable to address the same other terminal.

13. One terminal for use in a communications system comprising:

means adapted to be responsive when said one terminal receives a sequence of permutation coded signals to address said one terminal to then receive and record in response to at least some permutation coded signals received, means adapted to observe errors in at least some received signals and to transmit a reply signal indicative of said errors in said received signals in response to an error interrogation signal received by said one terminal, means adapted to be responsive to the receipt of a first unique sequence of permutation coded signals, including a sequence of permutation coded signals suitable to address at least one other terminal essentially identical in addressing response to said one terminal, to condition said one terminal to receive and record without transmitting said reply signal, and means adapted to be responsive to the receipt of a second unique sequence of permutation coded signals, including a sequence of permutation coded signals suitable to address at least one other terminal essentially identical in addressing response to said one terminal, to condition said one terminal to receive and record and to transmit said reply signal.

14. The terminal as in claim 13 in which both said signals suitable to address at least one other terminal are suitable to address the same other terminal.

15. One terminal for use in a communications system comprising:

means adapted to be responsive when said one terminal receives an address to then receive and record in response to at least some unique signals received, means adapted to observe errors in at least some received signals and to transmit a signal indicative of said error in said received signals, means adapted to be responsive to the receipt of a first unique signal in which a signal suitable to address at least one other terminal essentially identical in addressing response to said one terminal follows in said first unique signal a signal suitable to address said one terminal, to condition said one terminal to receive and record without transmitting said signal indicative of error, and means adapted to be responsive to the receipt of a second unique signal in which a signal suitable to address at least one other terminal essentially identical in addressing response to said one terminal is included and the last signal suitable to address a terminal essentially identical in addressing response to said one terminal is suitable to address said one terminal, to condition said one terminal to receive and record and to transmit said signal indicative of error.

16. The terminal as in claim 15 in which said first unique signal and said second unique signal each is a sequence of permutation coded signals.

17. The terminal as in claim 15 in which said unique signals which said one terminal is adapted to receive and record are permutation coded signals.

18. The terminal as in claim 16 in which said unique signals which said one terminal is adapted to receive and record are permutation coded signals.

19. The terminal as in claim 18 in which said signals suitable to address at least one other terminal are suitable to address the same other terminal.

20. One terminal for use in a communications system comprising:

means adapted to be responsive when said one terminal receives a sequence of permutation coded signals to address said one terminal to then receive and record in response to at least some permutation coded signals received, means adapted to observe errors in at least some received signals and to transmit a signal indicative of said error in said received signals, means adapted to be responsive to the receipt of a first unique sequence of permutation coded signals in which a sequence of permutation coded signals suitable to address at least one other terminal essentially identical in addressing response to said one terminal follows in said first unique sequence a signal suitable to address said one terminal, to condition said one terminal to receive and record without transmitting said signal indicative of error, and means adapted to be responsive to the receipt of a second unique sequence of permutation coded signals in which a sequence of permutation coded signals suitable to address at least one other terminal essentially identical in addressing response to said one terminal is included and the last signal suitable to address a terminal essentially identical in addressing response to said one terminal is suitable to address said one terminal, to condition said one terminal to receive and record and to transmit said signal indicative of error.

21. The terminal as in claim 20 in which said signals suitable to address at least one other terminal are suitable to address the same other terminal.

22. One terminal for use in a communications system comprising:

means adapted to be reponsive when said one terminal receives a first predetermined permutation coded signal to condition said one terminal into an addressed status upon receipt of a second predetermined permutation coded signal, said one terminal receiving and recording permutation coded signals received when in the addressed status, means adapted to observe errors in received signals and to transmit a reply signal indicative of said errors in said received signals in response to an error interrogation signal received by said one terminal, means adapted to be responsive to the receipt of a third unique permutation coded signal predetermined as a specific address designator of said one terminal and subsequently to a fourth unique permutation coded signal, to condition said one terminal to receive and record without transmitting said reply signal, and means adapted to be responsive to the receipt of said third unique permutation coded signal and the absence of a subsequent receipt of said fourth unique permutation coded signal, to condition said one terminal to receive and record and to transmit said reply signal.

23. The terminal as in claim 22 in which said fourth unique permutation coded signal is preselected as uniquely indicative of a transmission by another terminal in a communication system that said other terminal is addressed and is in a status to receive a message.

24. The terminal as in claim 22 also comprising means to reverse the effect of said first predetermined permutation coded signal by a fifth predetermined permutation coded signal indicative of end of addressing.

25. The terminal as in claim 23 also comprising means to reverse the effect of said first predetermined permutation coded signal by a fifth predetermined permutation coded signal indicative of end of addressing so that subsequent receipt of said fourth unique permutation code signal will no longer influence addressing.

26. A plurality of terminals as described in claim 1 connected in a communications link.

27. A plurality of terminals as described in claim 2 connected in a communications link.

28. A plurality of terminals as described in claim 3 connected in a communications link.

29. A plurality of terminals as described in claim 4 connected in a communications link.

30. A plurality of terminals as described in claim 5 connected in a communications link.

31. A plurality of terminals as described in claim 6 connected in a communications link.

32. A plurality of terminals as described in claim 7 connected in a communications link.

33. A plurality of terminals as described in claim 8 connected in a communications link.

34. A plurality of terminals as described in claim 9 connected in a communications link.

35. A plurality of terminals as described in claim 10 connected in a communications link.

36. A plurality of terminals as described in claim 11 connected in a communications link.

37. A plurality of terminals as described in claim 12 connected in a communications link.

38. A plurality of terminals as described in claim 13 connected in a communications link.

39. A plurality of terminals as described in claim 14 connected in a communications link.

40. A plurality of terminals as described in claim 15 connected in a communications link.

41. A plurality of terminals as described in claim 16 connected in a communications link.

42. A plurality of terminals as described in claim 17 connected in a communications link.

43. A plurality of terminals as described in claim 18 connected in a communications link.

44. A plurality of terminals as described in claim 19 connected in a communications link.

45. A plurality of terminals as described in claim 20 connected in a communications link.

46. A plurality of terminals as described in claim 21 connected in a communications link.

47. A plurality of terminals as described in claim 22 connected in a communications link.

48. A plurality of terminals as described in claim 23 connected in a communications link.

49. A plurality of terminals as described in claim 24 connected in a communications link.

50. A plurality of terminals as described in claim 25 connected in a communications link.

51. A plurality of terminals connected in a communications link, at least two of said terminals each comprising:

means adapted to receive and record in response to at least some unique signals received, means adapted to observe errors in received signals and to transmit a signal indicative of said error in said received signals, means adapted to be responsive to the receipt of a first unique signal to condition the terminal to receive and record without transmissing said signal indicative of error, and means adapted to be responsive to the receipt of a second unique signal to condition the terminal to receive and record and to transmit said signal indicative of error, each of said at least two terminals being responsive as herein recited to a said second unique signal which is unique from that to which the other said terminal is responsive as herein recited and being responsive as herein recited to a said first unique signal regardless of the receipt of a signal which is a said second unique signal to said other terminal.

52. The communications system as in claim 51 in which said first unique signal and said second unique signal each is a sequence of permutation coded signals.

53. The communications system as in claim 51 in which said means adapted to receive and record is adapted to respond to permutation coded signals.

54. A plurality of terminals connected in a communications link, at least two of said terminals each comprising:

means adapted to receive and record in response to at least some permutation signals received, means adapted to observe errors in received signals and to transmit a signal indicative of said error in said received signals, means adapted to be responsive to the receipt of a first unique permutation coded signal to condition the terminal to receive and record without transmitting said signal indicative of error, and means adapted to be responsive to the receipt of a second unique permutation coded signal to condition the terminal to receive and record and to transmit said signal indicative of error, each of said at least two terminals being responsive as herein recited to a said second unique permutation coded signal which is unique from that to which the other said terminal is responsive as herein recited and being responsive as herein recited to a said first unique permutation coded signal regardless of the receipt of a signal which is a said second unique permutation coded signal to said other terminal.

55. The communications system as in claim 54 in which said first unique permutation coded signal and said second unique permutation coded signal each is a unique sequence of permutated coded signals.

56. A plurality of terminals connected in a communications link, at least two of said terminals each comprising:

means adapted to receive and record in response to at least some unique signals received, means adapted to observe errors in at least some received signals and to transmit a reply signal indicative of said errors in said received signals in response to and error interrogration signal received by the terminal, means adapted to be responsive to the receipt of a first unique signal to condition the terminal to receive and record without transmitting said reply signal, means adapted to be responsive to the receipt of a second unique signal to condition the terminal to receive and record and to transmit said reply signal, each of said at least two terminals being responsive as herein recited to a said second unique signal which is unique from that to which the other said terminal is responsive as herein recited and being responsive as herein recited to a said first unique signal regardless of the receipt of a signal which is a second unique signal to said other terminal.

57. A communications system as described in claim 56 in which said first unique permutation coded signal and said second permutation coded signal each is a unique sequence of permutation coded signals.

58. The communications system as in claim 56 in which said means adapted to receive and record is adapted to respond to permutation coded signals.

59. A plurality of terminals connected in a communications link, at least two of said terminals each comprising:

means adapted to receive and record in response to at least some permutation coded signals received, means adapted to observe errors in at least some received signals and to transmit a reply signal indicative of said errors in said received signals in response to an error interrogation signal received by the terminal, means adapted to be responsive to the receipt of a first unique sequence of permutation coded signals to condition the terminal to receive and record without transmitting said error reply signal, means adapted to be responsive to the receipt of a second unique sequence of permutation coded signals to condition the terminal to receive and record and to transmit said error reply signal, each of said at least two terminals being responsive as herein recited to a said second unique permutation coded signal which is unique from that to which the other said terminal is responsive as herein recited and being responsive as herein recited to a first unique permutation coded signal regardless of the receipt of a signal which is a said second unique permutation coded signal to said other terminal.

60. A plurality of terminals connected in a communications link, at least two of said terminals each comprising:

means adapted to receive and record in response to at least some unique signals received, means adapted to observe errors in at least some received signals and to transmit a signal indicative of said error in said received signals, means adapted to be responsive to the receipt of a first unique signal to condition the terminal to receive and record without transmitting said signal indicative of error, and means adapted to be responsive to the receipt of a second unique signal in which a signal which is a said first unique signal to the other of said at least two terminals is included to condition the terminal to receive and record and to transmit said signal indicative of error, each of said at least two terminals being responsive as herein recited to a said second unique signal which is unique from that to which the other said terminal is responsive as herein recited and being responsive as herein recited to a said first unique signal regardless of the receipt of a signal which is a said second unique signal to said other terminal.

61. The communications system as in claim 60 in which said first unique signal and said second unique signal each is a sequence of permutation coded signals.

62. The communications system as in claim 60 in which said means adapted to receive and record is adapted to respond to permutation coded signals.

63. A plurality of terminals connected in a communications link, at least two of said terminals each comprising:

means adapted to receive and record in response to at least some permutation coded signals received, means adapted to observe errors in at least some received signals and to transmit a signal indicative of said error in said received signals, means adapted to be responsive to the receipt of a first unique sequence of permutation coded signals to condition the terminal to receive and record without transmitting said signal indicative of error, means adapted to be responsive to the receipt of a second unique sequence of permutation coded signals in which a signal which is a said first unique sequence of permutation coded signals to the other of said at least two terminals is included preceding the last signal of said second unique sequence of permutation coded signals to condition said one terminal to receive and record and to transmit said signal indicative of error, each of said at least two terminals being responsive as herein recited to a said second unique permutation coded signal which is unique from that to which the other said terminal is responsive as herein recited and being responsive as herein recited to a said first first unique permutation coded signal regardless of the receipt of a signal which is a said second unique permutation coded signal to said other terminal.

References Cited

UNITED STATES PATENTS

| | | | |
|---|---|---|---|
| 1,972,326 | 9/1934 | Angel | 178—3 |
| 2,912,485 | 11/1959 | Kaufman | 178—4.1 |
| 3,252,138 | 5/1966 | Young | 340—146.1 |

ROBERT C. BAILEY, *Primary Examiner.*

R. B. ZACHE, *Assistant Examiner.*